United States Patent
Schäfer

(10) Patent No.: US 7,036,655 B2
(45) Date of Patent: May 2, 2006

(54) METHOD AND DEVICE FOR SUPPLYING REGULARLY OBJECTS TO A WORK STATION

(75) Inventor: Wolfgang Schäfer, Ledgewood, NJ (US)

(73) Assignee: LTS Lohmann Therapie-Systeme AG, Andernach (DE)

(*) Notice: Subject to any disclaimer, the term of this patent is extended or adjusted under 35 U.S.C. 154(b) by 329 days.

(21) Appl. No.: 10/380,680

(22) PCT Filed: Sep. 5, 2001

(86) PCT No.: PCT/EP01/10194

§ 371 (c)(1),
(2), (4) Date: Aug. 4, 2003

(87) PCT Pub. No.: WO02/24556

PCT Pub. Date: Mar. 28, 2002

(65) Prior Publication Data

US 2004/0016622 A1 Jan. 29, 2004

Related U.S. Application Data

(60) Provisional application No. 60/233,418, filed on Sep. 18, 2000.

(30) Foreign Application Priority Data

Dec. 8, 2000 (DE) ................................. 100 61 003

(51) Int. Cl.
*B65G 47/26* (2006.01)

(52) U.S. Cl. ............................... 198/459.2; 198/463.4; 198/478.1

(58) Field of Classification Search .................. 193/40; 221/223; 198/530, 531, 478.1, 479.1, 480.1, 198/459.2, 459.6, 396
See application file for complete search history.

(56) References Cited

U.S. PATENT DOCUMENTS

| 1,961,697 | A |   | 6/1934  | Little ......................... 198/417 |
| 3,111,214 | A | * | 11/1963 | Lennart .................... 198/460.1 |
| 4,096,939 | A | * | 6/1978  | Riggs et al. ............. 198/460.1 |
| 4,519,492 | A |   | 5/1985  | Focke ........................ 198/408 |
| 5,310,041 | A | * | 5/1994  | Draghetti .................... 198/412 |

(Continued)

FOREIGN PATENT DOCUMENTS

DE         25 11 781 A    9/1976

(Continued)

*Primary Examiner*—James R. Bidwell
(74) *Attorney, Agent, or Firm*—Birch, Stewart, Kolasch & Birch, LLP

(57) ABSTRACT

A method and an apparatus wherein regular articles are fed to an operating station and the articles have handle elements arranged on two opposite sides. The successive articles are advanced up in abutment against one another on a moving transporting path, and are separated one after the other and fed individually, and in time with the operating cycle, to the operating station. The articles are advanced up in abutment against one another in a stable position and are fed individually, and without being adversely affected, to the operating station in the longitudinal direction. For this purpose, the articles are advanced up with the opposite sides transverse to the transporting direction and with the handle elements interengaging, and are separated by virtue of the following article being pushed back counter to the build-up pressure, caused by the following articles, on the transporting path in time with the operating cycle.

14 Claims, 2 Drawing Sheets

Figure 1A:
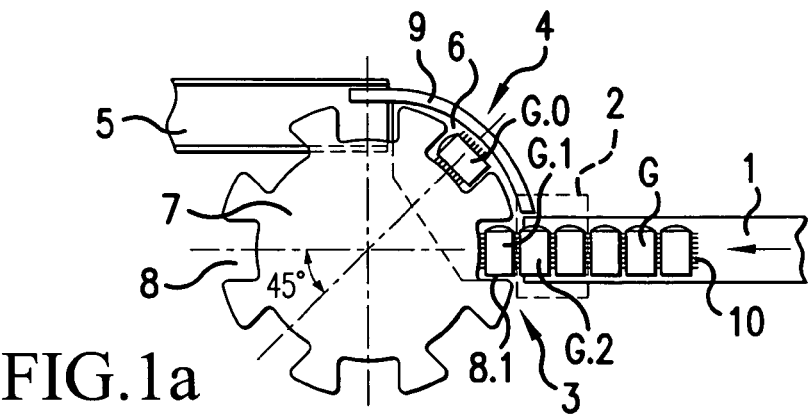

U.S. PATENT DOCUMENTS 5,603,398 A * 2/1997 Crouch .................... 198/459.2
5,695,041 A * 12/1997 Kouda et al. ............ 198/459.2
6,332,529 B1 * 12/2001 Kaishita et al. .......... 198/463.4
6,497,319 B1 * 12/2002 Atsumi et al. ........... 198/463.4

FOREIGN PATENT DOCUMENTS

EP 0 519 400 A 12/1992
JP 7-10257 * 7/1995 .............. 198/459.2

* cited by examiner

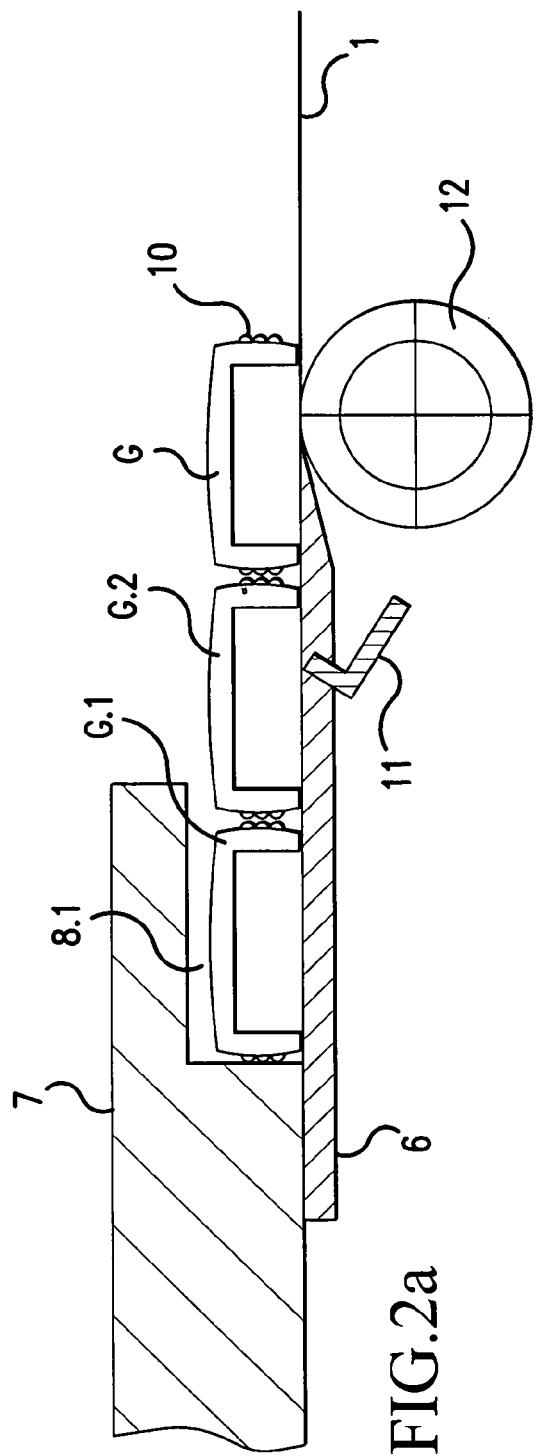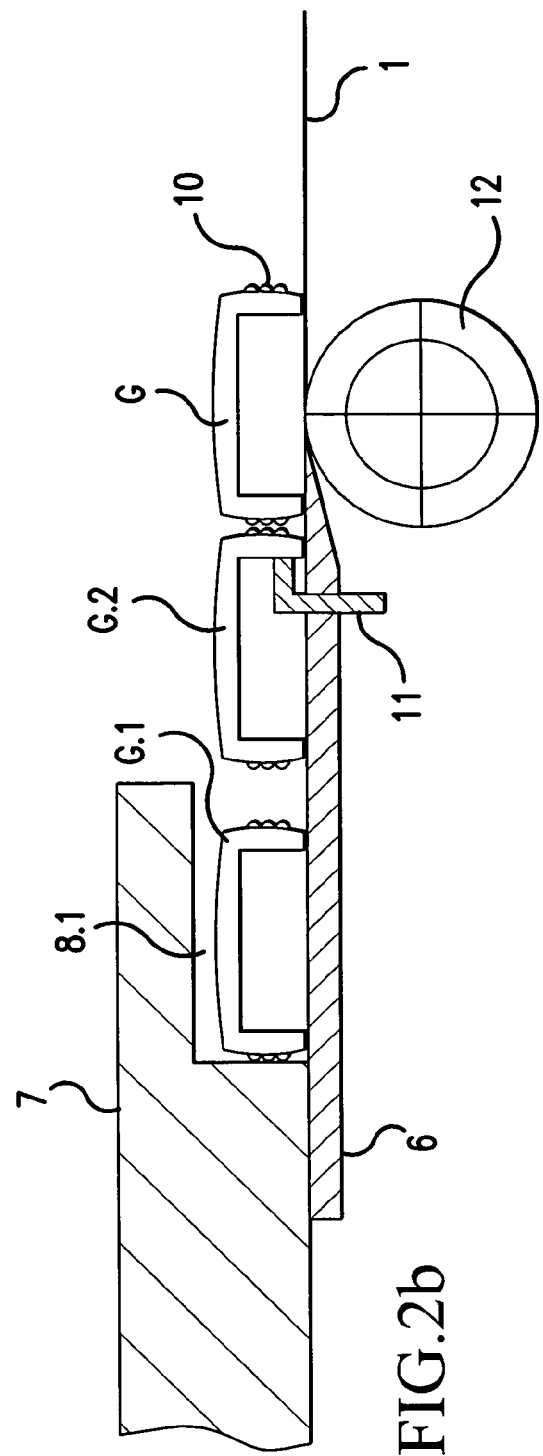

METHOD AND DEVICE FOR SUPPLYING REGULARLY OBJECTS TO A WORK STATION

This application is the national phase under 35 U.S.C. § 371 of PCT International Application No. PCT/EP01/10194 which has an International filing date of Sep. 5, 2001, which designated the United States of America.

BACKGROUND OF THE INVENTION

1. Field of the Invention

The invention relates to a method and an apparatus by means of which regular articles, in particular container parts, are fed to an operating station, the articles having projecting handle elements on two opposite sides.

2. Description of Background Art

Regular container parts may be provided with projecting handle elements on two opposite sides in order to ensure easier handling of the containers during opening and/or closing, the opposite sides running essentially parallel to the longitudinal axis of the container. When the container parts are fed to an operating station, in particular to a packaging machine, they have to be positioned in a predetermined manner. If the container parts are to be introduced into the packaging machine, and processed, in their longitudinal direction, they likewise have to be fed, directly upstream of the packaging machine, in the longitudinal direction. The container parts here are advanced up in abutment against one another and separated before they are introduced into the packaging machine, and the container parts following the separated container part are accumulated. If these then, as has been predetermined, are advanced up in abutment against one another in the longitudinal direction on a transporting path and, for separating purposes, are necessarily accumulated on the latter, displacement and jamming may occur on the transporting path since the container parts butt against one another by way of their narrow side and can only be supported against one another to a small extent. If the container parts are even beveled on a narrow side, this may result in container parts being pushed one over the other, as a result of which the operation of feeding to the packaging machine is disrupted and has to be interrupted.

It is thus advantageous for the container parts to be fed with their longitudinal direction transverse to the transporting path and to be accumulated cyclically in order to be separated and introduced into the packaging machine, with the result that the container parts can be better supported against one another and jamming or instances of container parts being pushed one over the other are largely avoided. In the case of accumulation, however, the oppositely directed handle elements of the abutting container parts may interlock. This is not important for the operation of the container parts being advanced up, although it is important for separating them and introducing them into the packaging machine. It is not possible for the front container part to be guided away laterally since its handle elements are interlocked with those of the following container part.

SUMMARY AND OBJECTS OF THE INVENTION

It is thus an object of the invention to provide a method by means of which regular articles, in particular container parts, are fed to an operating station according to the preamble of claim 1, in the case of which the articles are advanced up in abutment against one another in a stable position and are fed individually, and without being adversely affected, to the operating station in the longitudinal direction, and to specify an apparatus for implementing the method.

The object is achieved, by a method and apparatus wherein regular articles with handle elements are arranged on two opposite sides and are fed to an operating station. In a case wherein the successive articles are advanced up in abutment against one another on a moving transporting path, the articles are separated one after the other and fed individually, and in time with the operating cycle, to the operating station. The articles (G, G.0, G.1, G.2) are advanced up with the opposite sides transverse to the transporting direction and with the handle elements interengaging, wherein the separation takes place by virtue of the following article (G.2) being pushed back counter to the build-up pressure, caused by the following articles (G), on the transporting path (1), in time with the operating cycle. Thereafter, the separated article (G.1) is guided away transversely to the transporting path (transporting belt 1) and fed to the operating station with the opposite sides along a guide path.

The invention consists in that, when regular articles with handle elements arranged on two opposite sides are fed to an operating station, in the case of which operation the successive articles are advanced up in abutment against one another on a continuously moving transporting path, separated one after the other and fed individually, and in time with the operating cycle, to the operating station, the articles are advanced up with the opposite sides transverse to the transporting direction and with the handle elements facing one another and interlocked, and the respectively front article is separated in time with the operating cycle by virtue of the following article being pushed back counter to the build-up pressure, caused by the following articles, on the transporting path, and is guided away transversely to the transporting path and fed to the operating station on a guide path, the sides with the handle elements being oriented parallel to the feed direction. The articles are thus advanced up on the transporting path in a stable position, with the handle elements interlocked, and separated without being adversely affected by the other articles advanced up on the transporting path, and fed individually, and in time with the operating cycle, to the operating station in their longitudinal direction.

It is possible here for the operation of the respectively following article being restrained during separation to be associated with this article, and thus inevitably also the articles following the latter, being moved counter to the transporting direction thereof, preferably by considerably more than the width of the handle-element projection onto the container base plane, in order to increase the reliability of the separating operation.

It is possible for the article which is to be separated to be pushed by the build-up pressure onto a sliding surface arranged at the end of the transporting path and separated in the process and, thereafter, to be guided away by the sliding surface, in order that the position of the article remains stable following the separating and is not adversely affected by the movement of the transporting path.

In a preferred implementation of the method, the guide path is a slide path on which the articles are moved by external means, it being possible for the slide path, in dependence on the spatial assignment of the operating station, also to have a curved section. From the guide path, preferably a slide path, the articles pass automatically into the operating station.

The apparatus for implementing the method has a transporting belt for advancing the articles. A separating arrangement and a device for receiving the separated article are arranged at the end of the transporting belt, the separating arrangement pushing back the respectively second article, in the direction of the advancing transporting belt, once the first part has passed into the receiving device as a result of the build-up pressure of the transporting belt. The receiving device here, at the same time, is a constituent part of an arrangement for feeding the article to the operating station.

The apparatus preferably has mechanical pushing-back devices, in order for it to be possible to separate non-metallic articles.

The pushing-back or pressing-back means are advantageously connected to a short-stoke mechanism, which is a constituent part of the separating arrangement and also allows the container parts to move counter to the transporting direction of the articles (the conveying direction of the transporting belt).

The receiving device, which is arranged at the end of the transporting path, is provided with a receiving means for the separated article, it being possible for said receiving means to be moved transversely to the transporting path. The latter is preferably a turntable which is arranged above a stationary sliding surface and on the edge of which a plurality of recesses are formed at equal spacings as receiving means for in each case one article. The turntable is rotated in the feed direction in time with the operating cycle, such that a receiving means is positioned at the end of the transporting belt at the point in time of separation. The sliding surface is provided with a guide wall which is arranged vertically upward on the sliding surface, at a small spacing from the edge of the turntable, in the region between the transporting belt and the operating station, and, as it were, closes the receiving means during the operation of feeding to the operating station and retains the article therein as the turntable rotates. By means of the guide wall, it is possible for the article to be fed to the operating station at any desired angle in relation to the transporting belt. It is preferable, however, for the guide wall to be designed in an angle range of 90 degrees, with the result that the article, which is guided away transversely from the transporting belt, is guided with its longitudinal axis parallel to the transporting belt and is introduced into the operating station therein.

The sliding surface, on which the articles are guided through the turntable, terminates in a chute or has an opening for the articles through which the latter pass onto the chute, the latter receiving the articles and, at its bottom end, being arranged in alignment with a receiving arrangement provided at the operating station. As the article is transferred to the chute, the rotary cycle of the turntable, which is adapted to the operating cycle of the operating station, is completed. The recesses in the turntable are spaced apart from one another such that, when the rotary cycle is completed, a further recess is positioned at the end of the transporting belt for the purpose of receiving the next separated article.

An actuable restraining device for the article may be arranged at the operating station end of the chute, this restraining device restraining the article until such time as the receiving arrangement at the operating station corresponds with the end of the chute. It is thus possible for the precisely timed operation of feeding the articles out of a standby position to take place in an extremely short feeding period.

The abovedescribed apparatus does not subject the articles to mechanical stressing. Tolerance deviations in the dimensions of the articles are not critical.

BRIEF DESCRIPTION OF THE INVENTION

FIGS. 1a to 1d: show, schematically, a plan view of an apparatus for feeding regular articles to an operating station in a number of operating phases, and FIGS. 2a, b: show an associated separating arrangement illustrated schematically as a sectional drawing.

DETAILED DESCRIPTION OF THE PREFERRED EMBODIMENTS

FIGS. 1a to 1d show an apparatus which has a transporting belt 1, a separating arrangement 2, a receiving device 3 and a feed arrangement 4 and is intended to feed regular articles G (container parts) to a packaging machine (not illustrated). The receiving device 3 here is a constituent part of the feed arrangement 4. Arranged at the end of the feed arrangement 4 is a chute 5 for receiving the articles G and passing them on to the operating station. The receiving device 3 is formed from a turntable 7 and a stationary sliding surface 6 which is level with the transporting belt 1. The turntable 7 is arranged above the stationary sliding surface 6. On the edge of the turntable 7, recesses 8 are formed, for example, 4, 8, or more recesses 8. The recesses 8 are formed at equal spacings the angle spacings of the radial center lines of the recesses depend on the selected intervals on the turntable for in each case one article G. The sliding surface 6 is provided with a guide wall 9 which is positioned vertically on the latter and encloses the edge of the turntable 7, in the region between the transporting belt 1 and the chute 5, at a small spacing therefrom, the guide wall 9, in the plan view shown, being in the form of a circular-ring cutout of essentially 90 degrees. The sliding surface 6 is adjacent, on the packaging-machine side, to the chute 5, which has a downward inclination of approximately 30 to 60 degrees.

Figure 1B:
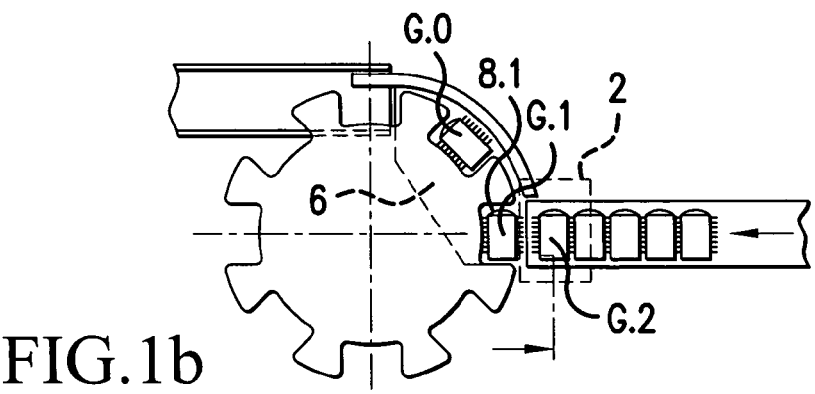

FIG. 1a shows the turntable in a standstill phase and position in which a recess 8.1 is positioned at the end of the transporting belt 1. The abutting container parts G advanced up thereon have handle elements 10 on the opposite sides transverse to the transporting direction, these handle elements respectively engaging with the handle elements 10 of a container part G which is conveyed upstream and of one which is conveyed downstream. These container parts G have pushed the front container part G.1 down from the transporting belt 1, and onto the sliding surface 6, as a result of the build-up pressure of the following container parts G. In this position, the container part G.1 is separated off from the following container parts by the separating arrangement 2 and disengaged from the second container part G.2 by virtue of the latter (G.2) being set back on the running transporting belt 1 by double the width of the handle-element projection onto the container-part base plane, and retained in the set-back position, by push rods which engage in the container part G.2 from underneath and are constituent parts of a short-stroke mechanism. The container part G.1 is thus separated. This phase is shown in FIG. 1b. The turntable is then rotated through 45 degrees or in accordance with the selected intervals, until the next recess 8.2 is positioned at the end of the transporting belt 1. In this case, the container part G.1 is guided away transversely to the conveying direction of the transporting belt and then moved along the guide wall 9 and retained by the latter in the recess 8.1.

Figure 1C:
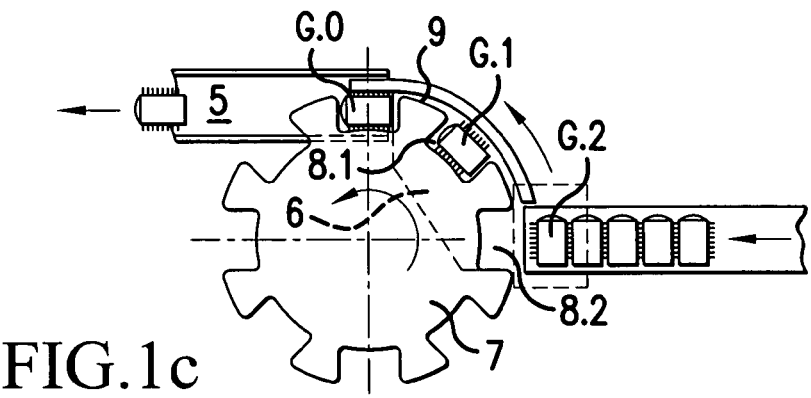
Figure 1D:
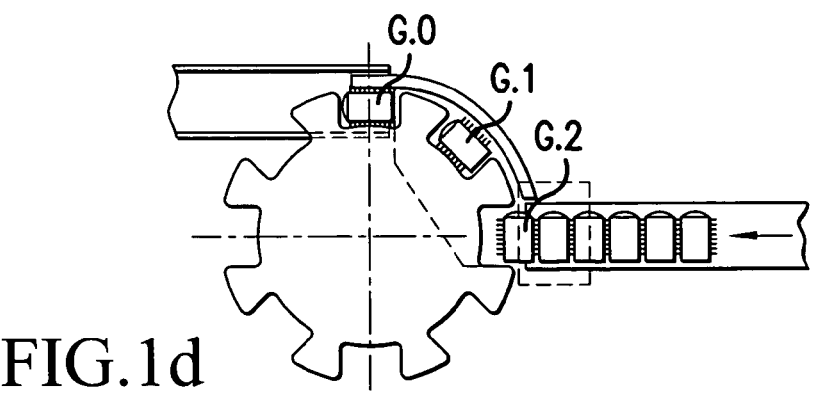

FIG. 1c shows the next standstill position reached. During the rotary phase of the turntable 6, the short-stroke mechanism still restrains the container parts G.2 and G on the transporting belt 1 and prevents the container part G.2 from being pushed onto the turntable 6.

Following the positioning of the recess 8.2, the short-stroke mechanism releases the container parts G by drawing the push rods back and advancing them into the engagement position. The container part G.2 is pushed into the recess 8.2. This is followed once again by an abovedescribed separating operation.

It is also shown in FIGS. 1b and 1c how a container part G.0, which is conveyed upstream of the container part G.1, is passed on. In FIG. 1b, this container part (G.0) is located in a rest position 45 degrees in front of the container part G.1 and is rotated through 45 degrees in relation to its removal position on the transporting belt 1 while the container part G.1 is separated. During subsequent rotation of the turntable 6 through 45 degrees (end position as shown in FIG. 1c), the container part G.0 is conveyed through a further 45 degrees, and thus is also rotated through a further 45 degrees and guided in its longitudinal direction onto the chute 5, which in the plan view is arranged parallel to the transporting belt 1, and passes, via this chute, into the packaging machine. This container part (G.0) is then followed by the container part G.1.

FIG. 2 illustrates an associated separating arrangement schematically as a sectional drawing.

The designations have the same meaning as in FIGS. 1a–d. (12) designates a transporting roller for moving the transporting belt (1). (11) designates a pushing-back device (a pushing-back or pressing-back means, e.g. push rods).

FIG. 2a shows the separating arrangement during the standstill phase corresponding to FIG. 1a. The front container G.1 has been pushed from the transporting belt 1 onto the sliding surface 6 and, finally, into the recess 8.1 of the turntable 7.

During this phase, the pushing-back device 11 is located in a bottom or initial position, the device being positioned beneath the following container part G.2, but not being in contact therewith.

FIG. 2b shows a state which corresponds to the state shown in FIG. 1b. Push rods 11 engaging into the container part G.2 from beneath, the push rods being constituent parts of a short-stroke mechanism, push the container part G.2 back counter to the conveying direction of the transporting belt, as has been described above in relation to FIGS. 1a/b. In this case, the container part G.1 is separated off from the following container part G.2. The turntable, with the separated-off container part G.1 located in the recess 8.1, is then rotated further in the manner specified. The next container part G.2 is retained, by the abovementioned push rods 11, in the set-back position until the next recess 8.2 is positioned at the end of the transporting belt 1. If this is the case, the push rods are moved back into their bottom, initial position, as a result of which the container part G.2 is released and pushed into the recess 8.2.

The apparatus may be controlled both electronically and mechanically, precisely timed coordination of the separating operation and of the operations of moving the turntable and of feeding the container parts into the packaging machine taking place.

It is not necessary for the feed arrangement to be monitored; the inflow of the packaging parts, coming from the transporting belt, should be ensured from the upstream apparatus.

The control arrangement is not part of the subject matter of the abovedescribed solution.

The invention claimed is:

1. A method by means of which regular articles with handle elements arranged on two opposite sides are fed to an operating station, in the case of which the successive articles are advanced up in abutment against one another on a moving transporting path, separated one after the other and fed individually, and in time with the operating cycle, to the operating station, comprising the following steps:
   advancing the articles (G, G.0, G.1, G.2) up with the opposite sides transverse to the transporting direction and with the handle elements (10) interengaging;
   separating the articles by virtue of the following article (G.2) being pushed back counter to the build-up pressure, caused by the following articles (G), on the transporting path (1), in time with the operating cycle, and
   separating the article (G.1) guided away transversely to the transporting path (transporting belt 1) and fed to the operating station with the opposite sides along a guide path, in particular, an inclined guide path.

2. The method as claimed in claim 1, characterized in that the separation takes place by virtue of the following article (G.2), and thus the articles (G) following the latter, moving counter to the transporting direction on the transporting path (transporting belt 1) by considerably more than the width of the handle-element projection.

3. The method as claimed in claim 1, characterized in that the articles (G), prior to the separation, at the end of the transporting path (transporting belt 1), are pushed onto a sliding surface (6) and, following the separation, are guided away by said sliding surface (6) or on the same (6).

4. The method as claimed in claim 1, characterized in that the guiding away of the separated articles takes place on a sliding surface (6) which is adjacent to a turntable (7) provided with corresponding recesses (8), said articles being moved by external means.

5. The method as claimed in claim 1, characterized in that the articles (G, G.0, G.1, G.2) pass automatically from the sliding surface (6) into the operating station.

6. An apparatus by means of which regular articles with handle elements arranged on two opposite sides are fed into an operating station, characterized in that it has a transporting belt (1) for advancing the articles (G, G.0, G.1, G.2), at the end of which a separating arrangement (2) for the respectively front article (C.1) and a device (3) for receiving said article are arranged, and in that the receiving device (3), at the same time, is a constituent part of a feed arrangement (4) for feeding the article (G, G.0, G.1, G.2) to the operating station.

7. The apparatus as claimed in claim 6, characterized in that the separating arrangement (2) has mechanical pushing-back devices (11) for the respectively second article (G.2), preferably push rods which engage in the second article from beneath.

8. The apparatus as claimed in claim 7, characterized in that the pushing-back devices (11) are a constituent part of a short-stroke mechanism with a movement component counter to the transporting direction of the articles (G.2, G).

9. The apparatus as claimed in claim 6, characterized in that the receiving device (3) has a receiving means (8.1, 8.2) for a separated article (G.1, G.2), it being possible for said receiving means to be moved transversely to the transporting belt (1) at the end of said transporting belt (1).

10. The apparatus as claimed in claim 6, characterized in that the receiving device (3) is a turntable (7) which is arranged above a stationary sliding surface (6) and on the edge of which a plurality of recesses (8, 8.1, 8.2) are formed at equal spacings as receiving means for in each case one article (G, G.0, G.1, G.2), the sliding surface (6) being provided with a guide wall (9) which is arranged vertically thereon and encloses the edge of the turntable (9), in the region between the transporting belt (1) and the operating station, at a small spacing therefrom.

11. The apparatus as claimed in claim 10, characterized in that the sliding surface (6) terminates at a chute (5), at the bottom end of which a receiving arrangement formed on the operating station may be positioned.

12. The apparatus as claimed in claim 10, characterized in that arranged at the end of the chute (5) is a restraining device for the article (G, G.0, G.1, G.2), this restraining device being actuable in time with the operating cycle and releasing the article as soon as the receiving arrangement corresponds with the chute (5).

13. The method as claimed in claim 3, characterized in that the guiding away of the separated articles takes place on a sliding surface (6) which is adjacent to a turntable (7) provided with corresponding recesses (8), said articles being moved by external means.

14. The method as claimed in claim 3, characterized in that the articles (G, G.0, G.1, G.2) pass automatically from the sliding surface (6) into the operating station.

\* \* \* \* \*